United States Patent
Lee (10) Patent No.: US 8,045,611 B2
(45) Date of Patent: Oct. 25, 2011

(54) VIDEO PROCESSING AND RECORDING APPARATUSES AND METHODS

(75) Inventor: Chang-Hung Lee, Yunlin (TW)

(73) Assignee: Qisda Corporation, Taoyuan County (TW)

( * ) Notice: Subject to any disclaimer, the term of this patent is extended or adjusted under 35 U.S.C. 154(b) by 1629 days.

(21) Appl. No.: 11/372,279

(22) Filed: Mar. 10, 2006

(65) Prior Publication Data

US 2006/0203904 A1    Sep. 14, 2006

(30) Foreign Application Priority Data

Mar. 14, 2005   (TW) ................................ 94107687 A (51) Int. Cl.
*H04N 7/12*   (2006.01)

(52) U.S. Cl. ......... 375/240.01; 375/240.02; 375/240.06; 375/240.1; 375/240.12; 382/232; 382/233; 382/236

(58) Field of Classification Search ............. 375/240.06, 375/240.8, 240.9, 240.1, 240.12, 240.16, 375/240.25; 382/232, 233, 236, 239
See application file for complete search history.

(56) References Cited

U.S. PATENT DOCUMENTS

| | | | | |
|---|---|---|---|---|
| 5,852,630 | A | * | 12/1998 | Langberg et al. ............. 375/219 |
| 7,054,363 | B2 | | 5/2006 | Gautier |
| 7,643,690 | B2 | * | 1/2010 | Suzuki et al. ................. 382/236 |
| 7,881,387 | B2 | * | 2/2011 | Han et al. ................. 375/240.25 |
| 2004/0213345 | A1 | * | 10/2004 | Holcomb et al. ........ 375/240.03 |
| 2005/0169545 | A1 | * | 8/2005 | Ratakonda et al. ........... 382/238 |
| 2006/0083303 | A1 | * | 4/2006 | Han et al. ................. 375/240.08 |
| 2006/0114993 | A1 | * | 6/2006 | Xiong et al. ............. 375/240.11 |

FOREIGN PATENT DOCUMENTS

CN   1365576 A   8/2002
JP   2004-200760 A   7/2004

* cited by examiner

*Primary Examiner* — Shuwang Liu
*Assistant Examiner* — Hirdepal Singh (57) ABSTRACT

A method for video processing. A first video sequence (VS) is received. The first VS is processed to generate a second VS in a first resolution. The second VS is adjusted to a third VS in a second resolution. It is determined whether the difference between the first VS and the third VS is lower than a predetermined bias level. The second VS is encoded and output if the difference between the first VS and the third VS is lower than the predetermined bias level.

12 Claims, 8 Drawing Sheets

VIDEO PROCESSING AND RECORDING APPARATUSES AND METHODS

BACKGROUND

The present invention relates to video encoding technology; and particularly to apparatuses and methods for video processing and recording.

Video compression is an important part of video storage and transmission. Digital video contains spatial and temporal redundancies, which may be encoded without significant sacrifice. Spatial redundancy is based on the similarity in color values shared by adjacent pixels. Video encoding employs intra-frame spatial encoding on redundant color values using DCT (Discrete Cosine Transform) and quantization. Temporal redundancy refers to identical temporal motion between video frames, providing smooth, realistic motion in video. Video encoding relies on prediction, more precisely, motion-compensated prediction, of temporal encoding between frames. Video encoding utilizes, to create temporal encoding, I-Frames, B-frames and P-frames. An I-frame is an intra-coded frame, a single image heading a sequence, with no reference to previous or subsequent frames. It encodes only within the frame with no reference to previous or subsequent frames. P-frames are forward-predictive frames, encoded with reference to a previous I- or P-frame, with pointers to information in a previous frame. B-frames are encoded with reference to a previous reference frame, a subsequent reference frame, or both. Motion vectors employed may be forward, backward, or both. Video encoding quantizes the coefficients produced by applying a DCT to 8×8 blocks of pixels in an image and through motion compensation. Quantization is basically division of the DCT coefficient by a quantization scale related to quality level, with higher indices for greater encoding but lower quality, and lower indices for the reverse.

Video recorders (e.g. MPEG recorders), however, in the beginning, reduced resolution of original video data to encode due to its process capability, resulting in poor output quality.

Figure 1:
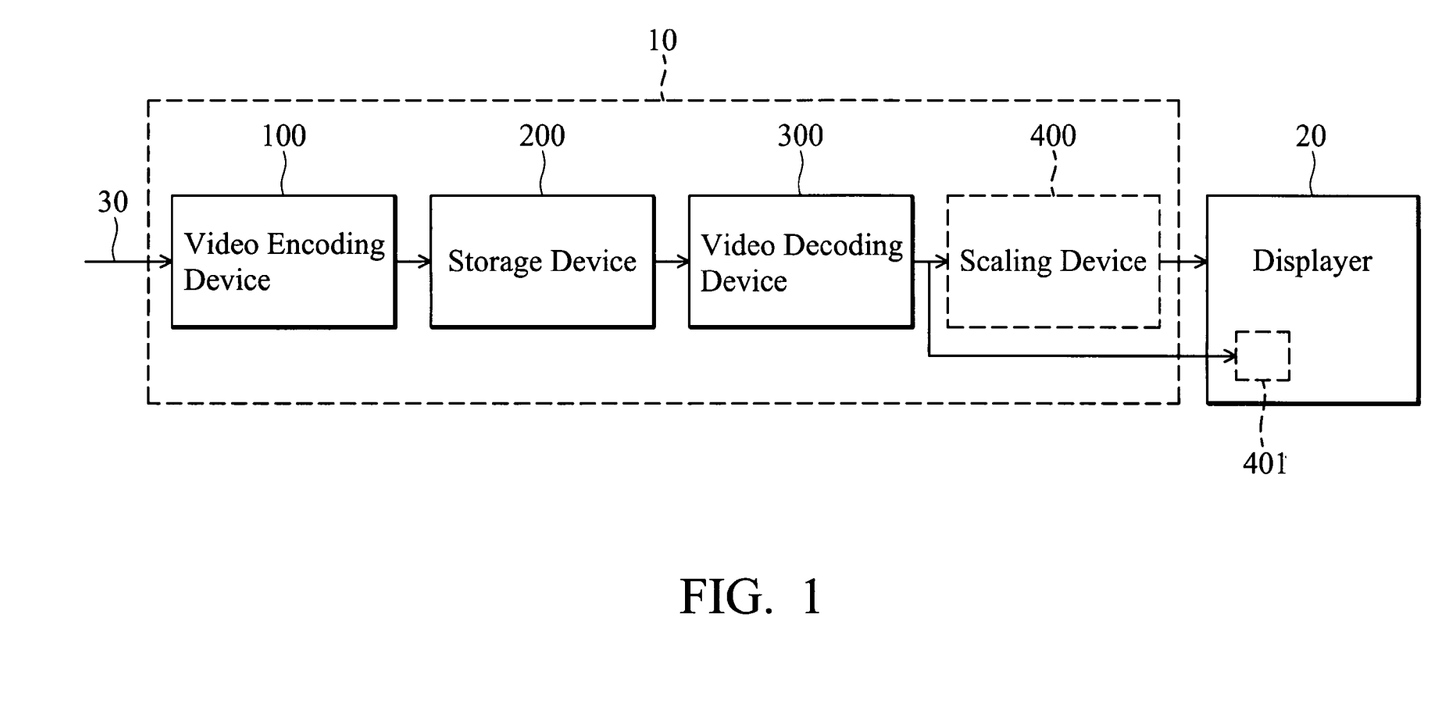
FIG. 1 is a diagram of the architecture of a conventional video data processing system.

Home recording apparatuses, such as VCD or DVD recorders, are unable to record video data in high resolution due to storage capacity. The resolution of the recorded data is much lower than the resolution of large-size displayer For example, the resolution of DVD recoding data is in 720×480. But the resolution of displayer is up to 1920×1440. FIG. 1 is a diagram of the architecture of a conventional video data processing system. Video apparatus 10 acquires and processes video data, and outputs the processed data to a displayer 20. After receiving original video data 30, video encoding device 100 encodes the original video data 30 in a predetermined resolution and stores it in storage device 200, such as VCD, DVD-RW or hard drive. To generate high quality video data, video decoding device 300 reads video data from the storage device and decodes it contingent upon the required resolution of a displayer 20, for example, the decoded data may be scaled up by a scaling device 400 or 401 in the displayer 20 to bring the decoded data to the required resolution. In conventional video data, serious distortion occurs during scaling up because the original video data 30 is encoded in the lower predetermined resolution by the video encoding device 100.

Figure 2:
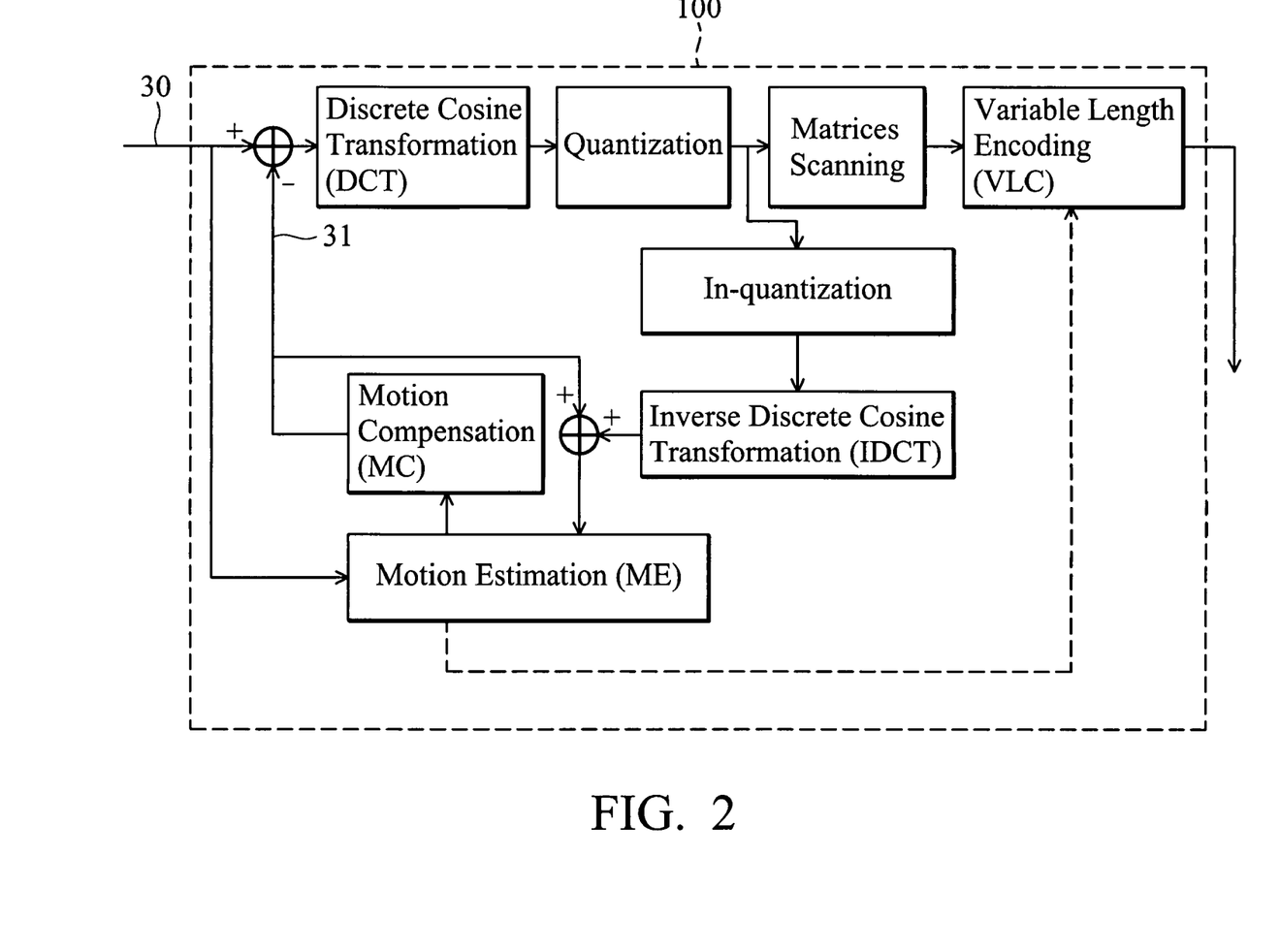
FIG. 2 is a diagram of conventional MPEG-2 single layer video encoding.

FIG. 2 is a diagram of conventional MPEG-2 single layer video encoding. The original video data 30 is input to the video encoding device 100 and frames therein are encoded according to frame type. I-frame directly undergoes DCT. Conversely, P- or B-frame first undergoes ME (Motion Estimation) to generate MV (Motion Vector), and MC (Motion Compensation), differential measurement between the original video data 30 and re-constructed video data 31 is calculated, and spatial data converted into frequency data by DCT. The converted frequency data is quantized by a relevant quantization matrix corresponding to the frame type to reduce complexity. The quantized two-dimensional data is converted to one-dimensional data and undergoes VLC to generate encoded data. Note that the original video data 30 and re-constructed video data 31 are generated in a predetermined resolution. When resolution of displayer 20 exceeds the predetermined resolution, serious distortion occurs.

SUMMARY

Methods for video processing, performed by an electronic apparatus, are provided. An embodiment of a method for video processing comprises receiving a first video sequence (VS), processing the first VS to generate a second VS in a first resolution, adjusting the second VS to a third VS in a second resolution, determining whether the difference between the first VS and the third VS lowers a predetermined bias level, and encoding and outputting the second VS if the difference between the first VS and the third VS is lower than the predetermined bias level. The method may further comprise calculating a differential value between the first VS and the third VS, and adjusting the differential value to generate the third VS in the first resolution.

Wherein the first resolution is lower than the second resolution. If an original VS is in a third resolution, the original VS is converted to the first VS in the second resolution. The electronic apparatus may be a computer, a hand-held device, a PDA (personal digital assistant), a microprocessor-based or programmable consumer electronics, or a digital video recorder.

The embodiment may further comprise acquiring statistical features corresponding to the third VS if the difference between the first VS and the third VS does not lower the predetermined bias level, redistributing a bitrate of each frame in the third VS contingent upon the acquired statistical features, and encoding the first VS to regenerate the second VS contingent upon the redistributed bitrates. The embodiment may further comprise acquiring statistical features corresponding to the third VS, redistributing a bitrate of each frame in the first VS contingent upon the acquired statistical features, and encoding the first VS to generate the second VS contingent upon the redistributed bitrates. The first VS may be encoded to acquire statistical features corresponding to the first VS using a CBR (constant bitrate) or a VBR (variable bitrate) approach.

A machine-readable storage medium storing a computer program which, when executed by an electronic apparatus, performs the method for video processing is also provided.

Apparatuses for video processing are further provided. An embodiment of the video processing apparatus comprises a video encoding unit. The video encoding unit receives a first VS, processes the first VS to generate a second VS in a first resolution, adjusts the second VS to a third VS in a second resolution, determines whether the difference between the first VS and the third VS is lower than a predetermined bias level, and, if so, encodes and outputs the second VS. Wherein the first resolution is smaller than the second resolution.

The video processing apparatus may be a computer, a hand-held device, a PDA (personal digital assistant), a microprocessor-based or programmable consumer electronics, or a digital video recorder. The video processing apparatus may further acquire statistical features corresponding to the third VS if the difference between the first VS and the third VS is not lower than the predetermined bias level, redistribute a bitrate of each frame in the third VS contingent upon the acquired statistical features, and encode the first VS to regenerate the second VS contingent upon the redistributed bitrates. The video processing apparatus may further acquire statistical features corresponding to the third VS, redistribute a bitrate of each frame in the first VS contingent upon the acquired statistical features, and encode the first VS to generate the second VS contingent upon the redistributed bitrates. The first VS may be encoded to acquire statistical features corresponding to the first VS using a CBR (constant bitrate) or a VBR (variable bitrate) approach.

The video processing apparatus may further comprise a video decoding unit and a scaling unit. The video decoding unit receives the second VS and decodes it to a fourth VS in the first resolution. The scaling unit receives the fourth VS, adjusts it to a fifth VS in the second resolution, and transmits the fifth VS to a displayer.

Preferably, the difference between the first VS and the third VS is measured by SNR (signal to noise ratio) or root-mean square error. The first VS comprises multiple frames in the second resolution, the second VS comprises multiple encoded frames in the first resolution, and the third VS comprises multiple encoded frames in the second resolution.

BRIEF DESCRIPTION OF THE DRAWINGS

The invention can be more fully understood by reading the subsequent detailed description and examples with references made to the accompanying drawings, wherein.

DESCRIPTION

Figure 3:
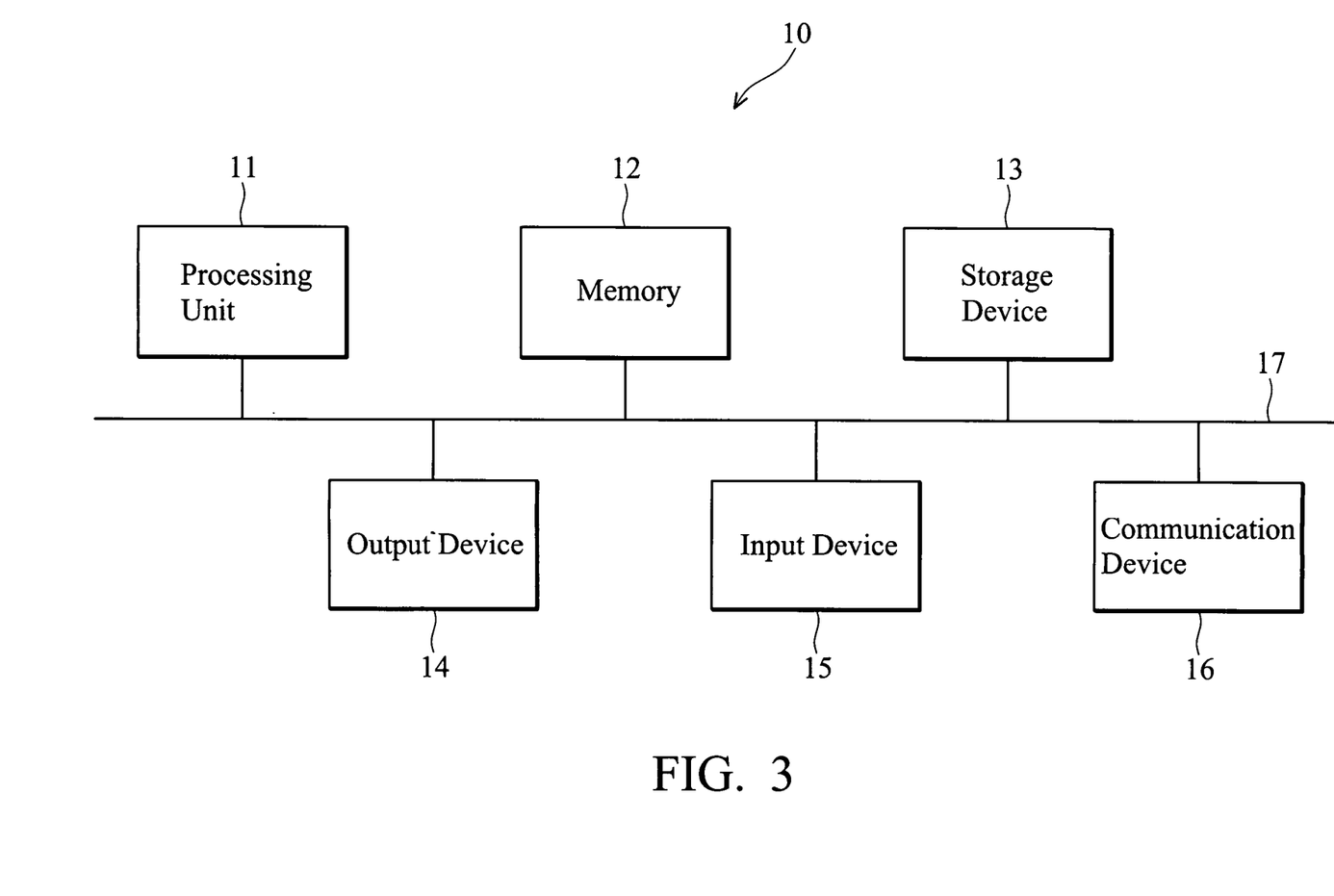
FIG. 3 is a diagram of the system architecture of an embodiment of a video recording apparatus.

FIG. 3 is a diagram of the system architecture of an embodiment of a video recording apparatus. The apparatus 10 includes a processing unit 11, a memory 12, a storage device 13, an input device 14, a display device 15 and a communication device 16. The hardware environment of FIG. 3 includes a processing unit 11, a memory 12, a storage device 13, an output device 14, an input device 15 and a communication device 16. The processing unit 11 is connected by buses 17 to the memory 12, storage device 13, output device 14, input device 15 and communication device 16 based on Von Neumann architecture. There may be one or more processing units 11, such that the processor of the computer comprises a single central processing unit (CPU), a micro processing unit (MPU) or multiple processing units, commonly referred to as a parallel processing environment. The memory 12 is preferably a random access memory (RAM), but may also include read-only memory (ROM) or flash ROM. The memory 12 preferably stores program modules executed by the processing unit 11 to perform video recording functions. Generally, program modules include routines, programs, objects, components, scripts, Web pages, or others, that perform particular tasks or implement particular abstract data types. Moreover, those skilled in the art will understand that some embodiments may be practiced with other computer system configurations, including hand-held devices, multiprocessor-based, microprocessor-based, digital video recorders, programmable consumer electronics, network PCs, minicomputers, mainframe computers, and the like. Some embodiments may also be practiced in distributed computing environments where tasks are performed by remote processing devices linked via a communication network. In a distributed computing environment, program modules may be located in both local and remote memory storage devices based on various remote access architecture such as DCOM, CORBA, Web objects, Web Services or other similar architectures. The storage device 13 may be a hard drive, magnetic drive, optical drive, portable drive, or nonvolatile memory drive. The drives and associated computer-readable media thereof (if required) provide nonvolatile storage of computer-readable instructions, data structures and program modules.

Figure 4:
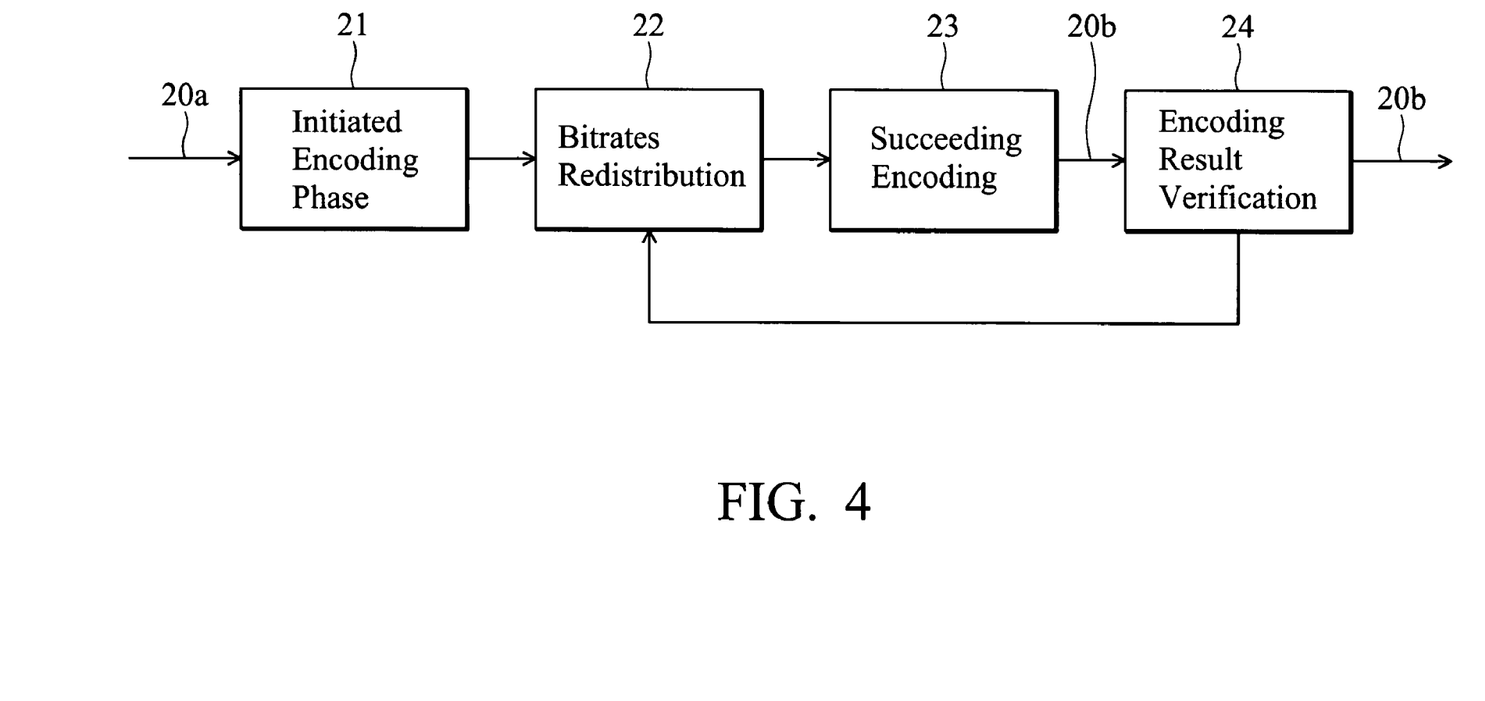
FIG. 4 is a schematic diagram of an embodiment of a multi-pass encoding method with VBR (variable bitrate)

Since the VS is inherently variable, a preferred encoding approach is a variable bitrate (VBR) encoder algorithm. A VBR encoder produces non-constant output bitrate over a period of time, and a complex frame with a higher bitrate than that of a simple one. VBR encoders use the same or different quantization scales throughout the entire VS to achieve constant video quality. In order to allocate the given bitrate budget into different frames more properly, a rate-control scheme must redistribute bitrate for each frame in the entire VS accurately under all possible quantization scales. Multi-pass variable bitrate (VBR) technology is preferably utilized. FIG. 4 is a schematic diagram of an embodiment of multi-pass encoding method with VBR. An initiated encoding phase 21 encodes the entire source 20a to acquire statistical features and determines the optimal distribution of bitrates which satisfy requisite constraints. Thereafter, the succeeding encoding phase as shown in 22, 23 and 24 encodes the entire source 20a by redistribution of bitrates according to the acquired statistical features and generates a VBR video stream 20b. It is noted that the encoded VS in the initiated pass is ignored and is not carried into the succeeding pass. Thereafter, the video stream 20b with redistributed VBR is verified, and, if passed, the VBR video stream 20b is output, and otherwise, bitrate redistribution is performed.

Figure 5:
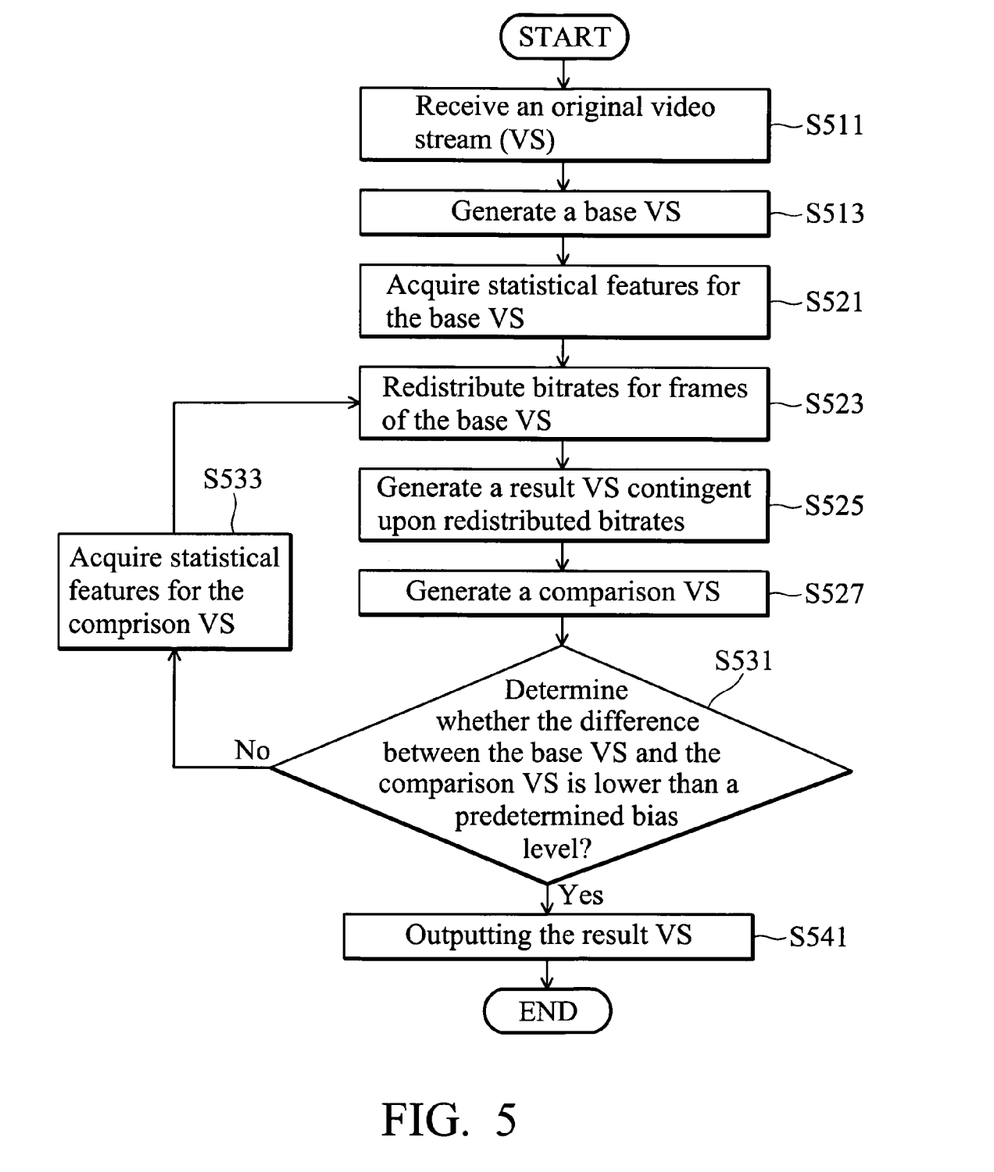
FIG. 5 is a flowchart of an embodiment of a method of a multi-pass video encoding.

FIG. 5 is a flowchart of an embodiment of a method of multi-pass video encoding. The method begins in step S511, receiving an original video sequence (VS). In step S521, all frames in the original VS are scaled up to generate a base VS. In step S515, each frame in the base VS is encoded to acquire relevant statistical features, such as a bitrate to each frame in the analysis window, the quantization scale, complexity of the frame, or others. It is noted that the above encoding may use a constant bitrate (CBR) approach, a variable bitrate (VBR) approach, or others. Different scenes have different features, such as activity or motion, ranging from low activity and slow-motion scenes to high activity and fast-motion scenes, with the VBR encoding bitrate varying with each. In step S523, bitrates to frames in the original VS are calculated (redistributed) contingent upon the calculated statistical features. Note that the bitrate redistribution gives frames with higher complexity higher bitrates than frames with lower complexity. In step S525, the original VS is encoded contingent upon the redistributed bitrates to generate a result VS. In step S527, all frames in the result VS are decoded to generate a comparison VS. In step S531, it is determined whether the difference between the base VS and the comparison VS is lower than a predetermined bias level. If so, the process proceeds to step S541, and otherwise, to step S533. The difference between the base VS and the comparison VS may be represented by SNR (signal to noise ratio) or root-mean square error, and it is subsequently determined whether the calculated SNR or root-mean square error lowers a predetermined bias level. The SNR is reported in Decibels (dB), with higher numbers indicating higher correlation between images. RMSE value is also utilized to represent the difference between images. A higher RMSE value indicates a higher error indication. In step S533, relevant statistical features are acquired from the result VS. In step S541, the result VS is output. Although sequence of the method has been described in this embodiment, it is not intended to limit the method to the precise order disclosed herein. Those skilled in the art can perform variations without departing from the scope and spirit of this invention.

Figure 6:
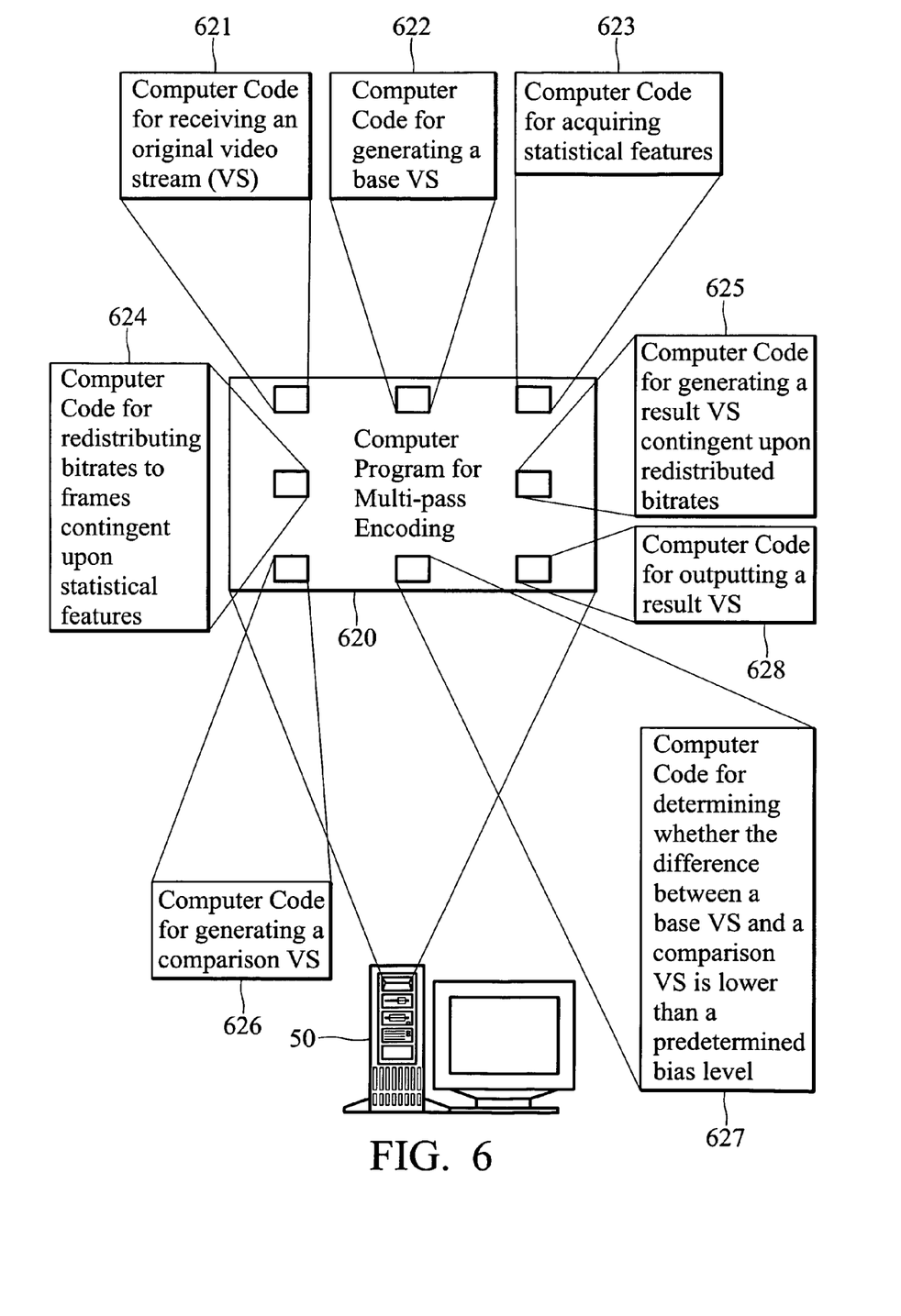
FIG. 6 is a diagram of a storage medium for a computer program providing an embodiment of a method for video processing.

The invention additionally discloses a storage medium storing a computer program providing the disclosed embodiment of a method of multi-pass video encoding, as shown in FIG. 6. The computer program product includes a storage medium 60 having computer readable program code embodied therein, the computer readable program code comprising at least computer readable program code 621 receiving an original VS, computer readable program code 622 generating a base VS, computer readable program code 623 acquiring statistical features, computer readable program code 624 redistributing bitrates to frames contingent upon statistical features, computer readable program code 625 generating a result VS contingent upon redistributed bitrates, computer readable program code 626 generating a comparison VS, computer readable program code 627 determining whether the difference between a base VS and a comparison VS is lower than a predetermined bias level, and computer readable program code 628 outputting a result VS.

Embodiments of the methods and apparatuses or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 7:
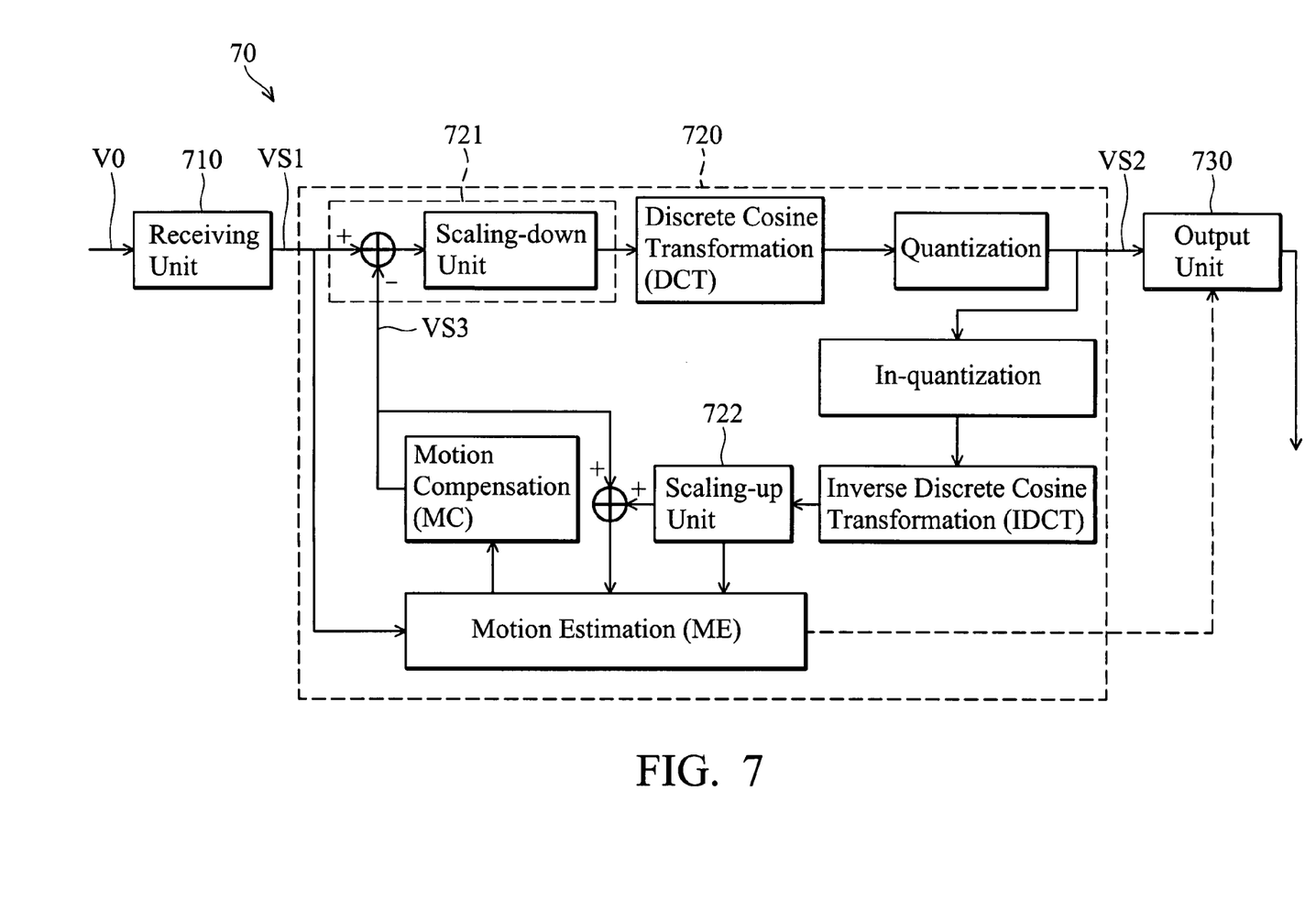
FIG. 7 is a diagram of an embodiment of a recording apparatus.

FIG. 7 is a diagram of an embodiment of a recording apparatus 70 comprising a receiving unit 710, an encoding unit 720 and an output unit 730. The receiving unit 710 outputs a video stream VS1 to the encoding unit 720, and the encoding unit 720 processes the video stream VS1 to generate a video stream VS2 in a first resolution. The process comprises a DCT (Discrete Cosine Transform) procedure and a quantization procedure with quantization matrices contingent upon particular frame types. The encoding unit 720 adjusts the video stream VS2 to a video stream VS3 in a second resolution. The video stream VS2 undergoes an inverse DCT procedure and an in-quantization procedure with inverse in-quantization matrices, scaled up by a scaling-up unit 722 to the second resolution, a ME (motion estimation) procedure to calculate a MV (motion vector), and a MC (motion compensation) procedure contingent upon the MV to generate the re-constructed video stream VS3.

The receiving unit 710 receives an original video stream V0. When the original video stream V0 is in the second resolution, the receiving unit 710 outputs the original video stream V0 as the video stream VS1, and conversely, when the original video stream V0 is in a third resolution, other than the second resolution, the receiving unit 710 adjusts the original video stream V0 to a video stream in the second resolution, and outputs the adjusted stream as video stream VS1. Video stream VS1 and video stream VS3 are compared by the comparison unit 721 to generate a difference value. The comparison unit 721 further adjusts the difference value to enable a video stream in the first resolution, wherein the first resolution is smaller than the second resolution and the third resolution. Thus, the resolution 721 can detect variations between frames and compare higher resolution video streams more accurately than the conventional technology.

When the difference between the video stream VS1 and the video stream VS3 is lower than a predetermined bias level, the output unit 730 encodes and outputs the video stream VS2.

Referring to FIG. 1, the video apparatus 10 may be equipped with the video recording apparatus 70, and, connected to the displayer 20, comprises the video encoding device 100, storage device 200, video encoding device 300 and scaling device 400. The storage device 200 stores video data received from the video encoding device 100. Video decoding device 300 decodes the video data from the storage device 200 contingent upon the resolution specification of the displayer 20. It may scale up video data in lower resolution to higher resolution by way of the scaling device 400 or 401 in the displayer 20.

Figure 8:
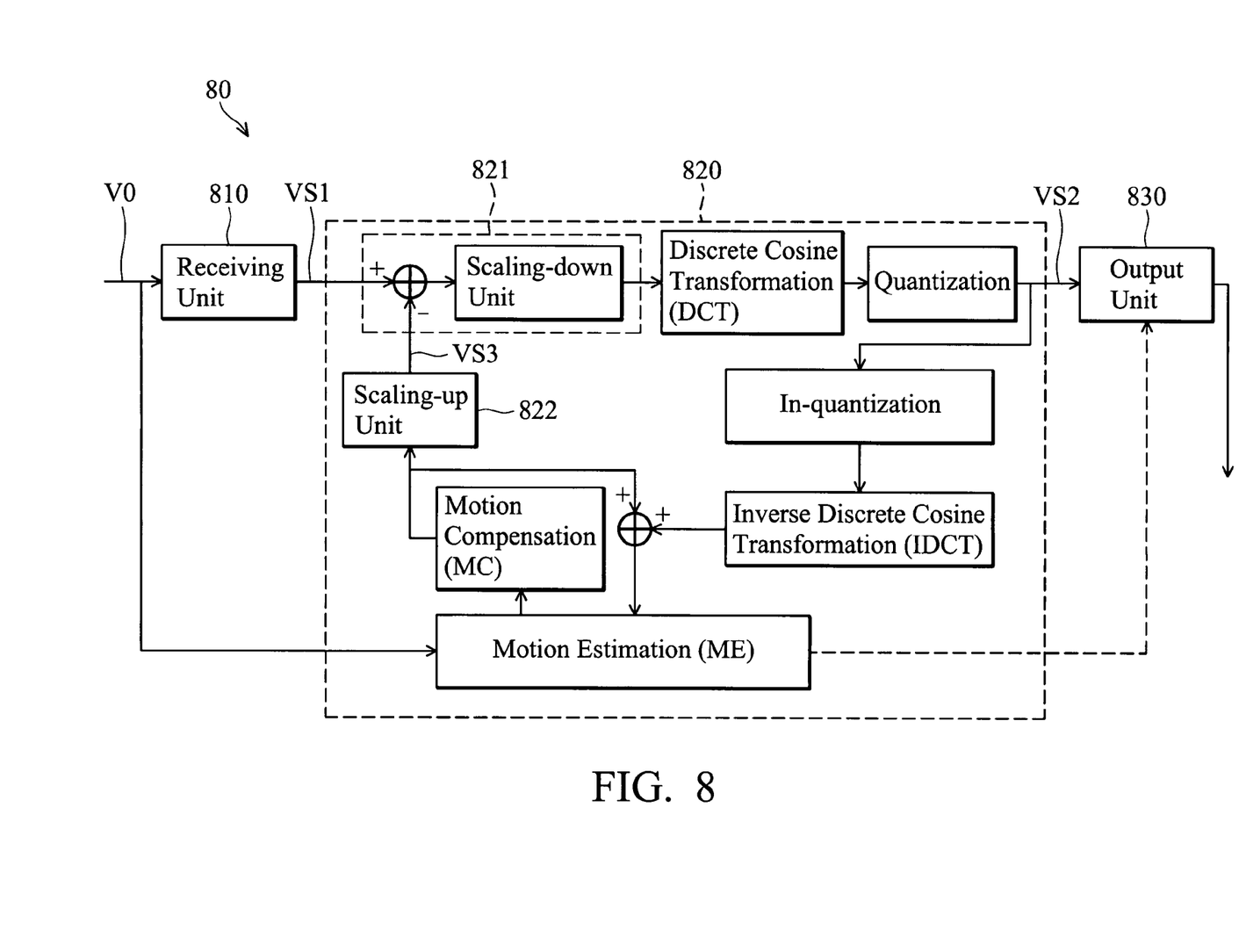
FIG. 8 is a diagram of an embodiment of a recording apparatus.

FIG. 8 is a diagram of an embodiment of a recording apparatus 80. The adjustment of the stream video VS3 differs from that depicted in FIG. 7. A video stream VS2 sequentially undergoes an inverse DCT procedure and an inverse quantization procedure with quantization matrices, a ME to calculate MV, a MC contingent upon the calculated MV, and scaling up by the scaling-up unit 822 to generate re-constructed video stream VS3 in the second resolution. Such adjustment consumes less computation capacity in ME and MC, and thus processing time is less than that depicted in FIG. 7.

Although the present invention has been described in terms of preferred embodiment, it is not intended to limit the invention thereto. Those skilled in the technology can still make various alterations and modifications without departing from the scope and spirit of this invention. Therefore, the scope of the present invention shall be defined and protected by the following claims and their equivalents.

What is claimed is:

1. A method for video processing, performed by an electronic apparatus, comprising:
receiving a first video sequence (VS);
processing the first VS to generate a second VS in a first resolution;
adjusting the second VS to a third VS in a second resolution;
determining whether the difference between the first VS and the third VS is lower than a predetermined bias level;
acquiring statistical features corresponding to the third VS if the difference between the first VS and the third VS is not lower than the predetermined bias level;
redistributing a bitrate of each frame in the third VS contingent upon the acquired statistical features;

encoding the first VS to regenerate the second VS contingent upon the redistributed bitrates; and encoding and outputting the second VS if the difference between the first VS and the third VS is lower than the predetermined bias level.

2. The method as claimed in claim 1 wherein the first resolution is smaller than the second resolution.

3. The method as claimed in claim 1, further comprising:
calculating a differential value between the first VS and the third VS; and
adjusting the differential value to generate the third VS in the first resolution.

4. The method as claimed in claim 3, further comprising:
receiving an original VS in a third resolution; and
converting the original VS to the first VS in the second resolution.

5. The method as claimed in claim 1 wherein the electronic apparatus is a computer, a hand-held device, a PDA (personal digital assistance), a microprocessor-based or programmable consumer electronics, or a digital video recorder.

6. The method as claimed in claim 1 wherein the difference between the first VS and the third VS is measured by SNR (signal to noise ratio) or root-mean square error.

7. The method as claimed in claim 1 wherein the first VS comprises a plurality of frames in the second resolution, the second VS comprises a plurality of encoded frames in the first resolution, and the third VS comprises a plurality of encoded frames in the second resolution.

8. An apparatus for video encoding comprising:
a receiving unit;
an encoding unit coupled to the receiving unit, receiving a first video sequence (VS), processing the first VS to generate a second VS in a first resolution, adjusting the second VS to a third VS in a second resolution; and
an output unit encoding and outputting the second VS if the difference between the first VS and the third VS is lower than the predetermined bias level, wherein if the difference between the first VS and the third VS is not lower than the predetermined bias level, acquiring statistical features corresponding to the third VS, redistributing a bitrate of each frame in the third VS contingent upon the acquired statistical features, the encoding unit encodes the first VS to regenerate the second VS contingent upon the redistributed bitrates.

9. The apparatus as claimed in claim 8 wherein the encoding unit further comprises a comparison unit calculating a differential value between the first VS and the third VS, and adjusting the differential value to generate the third VS in the first resolution.

10. The apparatus as claimed in claim 9 wherein the receiving unit receiving an original VS in a third resolution, and converting the original VS to the first VS in the second resolution.

11. A method for video processing, performed by an electronic apparatus, comprising:
receiving a first video sequence (VS);
processing the first VS to generate a second VS in a first resolution;
adjusting the second VS to a third VS in a second resolution;
determining whether the difference between the first VS and the third VS is lower than a predetermined bias level;
acquiring statistical features corresponding to the third VS;
redistributing a bitrate of each frame in the first VS contingent upon the acquired statistical features; and
encoding the first VS to generate the second VS contingent upon the redistributed bitrates; and
encoding and outputting the second VS if the difference between the first VS and the third VS is lower than the predetermined bias level.

12. The method as claimed in claim 11 further comprising encoding the first VS to acquire statistical features corresponding to the first VS using a CBR (constant bitrate) or a VBR (variable bitrate) approach.

* * * * *